United States Patent
Major (10) Patent No.: US 11,172,269 B2
(45) Date of Patent: Nov. 9, 2021

(54) AUTOMATED COMMERCIAL CONTENT SHIFTING IN A VIDEO STREAMING SYSTEM

(71) Applicant: DISH Network L.L.C., Englewood, CO (US)

(72) Inventor: Robert Drew Major, Orem, UT (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 16/808,690

(22) Filed: Mar. 4, 2020

(65) Prior Publication Data

US 2021/0281923 A1    Sep. 9, 2021

(51) Int. Cl.
| | |
|---|---|
| H04N 21/234 | (2011.01) |
| H04N 21/2343 | (2011.01) |
| H04N 21/262 | (2011.01) |
| H04N 21/434 | (2011.01) |
| H04N 21/45 | (2011.01) |
| H04N 21/81 | (2011.01) |
| H04N 21/442 | (2011.01) |

(Continued)

(52) U.S. Cl.
CPC ..... *H04N 21/812* (2013.01); *H04N 21/25883* (2013.01); *H04N 21/26241* (2013.01); *H04N 21/4147* (2013.01); *H04N 21/44222* (2013.01)

(58) Field of Classification Search
None
See application file for complete search history.

(56) References Cited

U.S. PATENT DOCUMENTS

| | | | |
|---|---|---|---|
| 3,682,363 | A | 8/1972 | Hull |
| 3,919,479 | A | 11/1975 | Moon |

(Continued)

FOREIGN PATENT DOCUMENTS

| | | |
|---|---|---|
| EP | 521454 | 1/1993 |
| EP | 594241 | 4/1994 |

(Continued)

OTHER PUBLICATIONS

Associated Press "AT&T Lets Mobile Phones Control Your Television," Mar. 6, 2007.

(Continued)

*Primary Examiner* — Brian T Pendleton
*Assistant Examiner* — Jean D Saint Cyr
(74) *Attorney, Agent, or Firm* — Lorenz & Kopf, LLP (57) ABSTRACT

Systems, devices and processes are provided to facilitate the streaming of commercial content in a video streaming system. Various embodiments facilitate the improved delivery of commercial content in a video streaming system by providing the ability to shift content to allow multiple relatively short commercials to be replaced with one or more longer commercials. As an example, a program channel is monitored to detect commercial content that has a first timespan. This commercial content is replaced with replacement commercial content that has a different timespan. The timing of the video stream is then adjusted to compensate for the difference in the timespan. For example, by monitoring the program channel to detect later commercial content that also has a timespan less than a threshold amount and then skipping this later detected commercial content.

13 Claims, 3 Drawing Sheets

(51) Int. Cl.
*H04N 21/258* (2011.01)
*H04N 21/4147* (2011.01)

(56) References Cited

U.S. PATENT DOCUMENTS

| | | |
|---|---|---|
| 3,942,190 A | 3/1976 | Detweiler |
| 4,224,481 A | 9/1980 | Russell |
| 4,313,135 A | 1/1982 | Cooper |
| 4,331,974 A | 5/1982 | Cogswell et al. |
| 4,388,659 A | 6/1983 | Lemke |
| 4,404,589 A | 9/1983 | Wright, Jr. |
| 4,408,309 A | 10/1983 | Kiesling et al. |
| 4,439,785 A | 3/1984 | Leonard |
| 4,450,531 A | 5/1984 | Kenyon |
| 4,520,404 A | 5/1985 | Von Kohorn |
| 4,602,297 A | 7/1986 | Reese |
| 4,605,964 A | 8/1986 | Chard |
| 4,633,331 A | 12/1986 | McGrady et al. |
| 4,665,431 A | 5/1987 | Cooper |
| 4,697,209 A | 9/1987 | Kiewit |
| 4,706,121 A | 11/1987 | Young |
| 4,739,398 A | 4/1988 | Thomas |
| 4,750,213 A | 6/1988 | Novak |
| 4,755,889 A | 7/1988 | Schwartz |
| 4,760,442 A | 7/1988 | O'Connell et al. |
| 4,761,694 A | 8/1988 | Shudo et al. |
| 4,789,961 A | 12/1988 | Tindall |
| 4,805,217 A | 2/1989 | Morihiro et al. |
| 4,816,905 A | 3/1989 | Tweedy et al. |
| 4,833,710 A | 5/1989 | Hirashima |
| 4,876,670 A | 10/1989 | Nakabayashi |
| 4,888,769 A | 12/1989 | Deal |
| 4,891,715 A | 1/1990 | Levy |
| 4,897,867 A | 1/1990 | Foster et al. |
| 4,916,682 A | 4/1990 | Tomoda et al. |
| 4,918,730 A | 4/1990 | Schulze |
| 4,920,533 A | 4/1990 | Dufresne et al. |
| 4,930,160 A | 5/1990 | Vogel |
| 4,939,594 A | 7/1990 | Moxon et al. |
| 4,947,244 A | 8/1990 | Fenwick et al. |
| 4,949,169 A | 8/1990 | Lumelsky et al. |
| 4,949,187 A | 8/1990 | Cohen |
| 4,963,866 A | 10/1990 | Duncan |
| 4,963,995 A | 10/1990 | Lang |
| 4,972,190 A | 11/1990 | Primeau et al. |
| 4,974,085 A | 11/1990 | Campbell et al. |
| RE33,535 E | 2/1991 | Cooper |
| 4,991,033 A | 2/1991 | Takeshita |
| 5,014,125 A | 5/1991 | Pocock et al. |
| 5,018,014 A | 5/1991 | Hashimoto |
| 5,057,932 A | 10/1991 | Lang |
| 5,063,453 A | 11/1991 | Yoshimura et al. |
| 5,093,718 A | 3/1992 | Hoarty et al. |
| 5,121,476 A | 6/1992 | Yee |
| 5,126,852 A | 6/1992 | Nishino et al. |
| 5,126,982 A | 6/1992 | Yifrach |
| 5,130,792 A | 7/1992 | Tindell et al. |
| 5,132,992 A | 7/1992 | Yurt et al. |
| 5,134,499 A | 7/1992 | Sata et al. |
| D329,269 S | 9/1992 | Szabad, Jr. et al. |
| 5,168,353 A | 12/1992 | Walker |
| 5,191,410 A | 3/1993 | McCalley et al. |
| 5,202,761 A | 4/1993 | Cooper |
| 5,227,876 A | 7/1993 | Cucchi et al. |
| 5,233,423 A | 8/1993 | Jernigan et al. |
| 5,241,428 A | 8/1993 | Goldwasser et al. |
| 5,245,430 A | 9/1993 | Nishimura |
| 5,247,347 A | 9/1993 | Litteral et al. |
| 5,253,275 A | 10/1993 | Yurt et al. |
| 5,311,423 A | 5/1994 | Clark |
| 5,329,320 A | 7/1994 | Yifrach |
| 5,333,091 A | 7/1994 | Iggulden |
| 5,357,276 A | 10/1994 | Banker et al. |
| 5,361,261 A | 11/1994 | Edem et al. |
| 5,371,551 A | 12/1994 | Logan et al. |
| 5,412,416 A | 5/1995 | Nemirofsky |
| 5,414,455 A | 5/1995 | Hooper et al. |
| 5,434,678 A | 7/1995 | Abecassis |
| 5,438,423 A | 8/1995 | Lynch |
| 5,440,334 A | 8/1995 | Walters et al. |
| 5,442,390 A | 8/1995 | Hooper et al. |
| 5,442,455 A | 8/1995 | Hioki et al. |
| 5,452,006 A | 9/1995 | Auld |
| 5,453,790 A | 9/1995 | Vermeulen et al. |
| 5,461,415 A | 10/1995 | Wolf et al. |
| 5,461,428 A | 10/1995 | Yoo |
| 5,477,263 A | 12/1995 | O'Callaghan et al. |
| 5,481,542 A | 1/1996 | Logston et al. |
| 5,508,940 A | 4/1996 | Rossmer et al. |
| 5,510,905 A | 4/1996 | Birk |
| 5,513,011 A | 4/1996 | Matsumoto et al. |
| 5,517,250 A | 5/1996 | Hoogenboom et al. |
| 5,521,630 A | 5/1996 | Chen et al. |
| 5,528,282 A | 6/1996 | Voeten et al. |
| 5,533,021 A | 7/1996 | Branstad et al. |
| 5,535,137 A | 7/1996 | Rossmere et al. |
| 5,535,229 A | 7/1996 | Hain, Jr. et al. |
| 5,537,408 A | 7/1996 | Branstad et al. |
| 5,541,919 A | 7/1996 | Young et al. |
| 5,550,594 A | 8/1996 | Cooper et al. |
| 5,553,005 A | 9/1996 | Voeten et al. |
| 5,555,463 A | 9/1996 | Staron et al. |
| 5,555,555 A | 9/1996 | Sato et al. |
| 5,557,538 A | 9/1996 | Reter et al. |
| 5,557,541 A | 9/1996 | Schulhof et al. |
| 5,559,999 A | 9/1996 | Maturi et al. |
| 5,563,714 A | 10/1996 | Inoue et al. |
| 5,572,261 A | 11/1996 | Cooper |
| 5,574,662 A | 11/1996 | Windrem et al. |
| 5,581,479 A | 12/1996 | McLaughlin et al. |
| 5,583,561 A | 12/1996 | Baker et al. |
| 5,583,652 A | 12/1996 | Ware |
| 5,586,264 A | 12/1996 | Belknap et al. |
| 5,600,364 A | 2/1997 | Hendricks et al. |
| 5,603,058 A | 2/1997 | Belknap et al. |
| 5,604,544 A | 2/1997 | Bertram |
| 5,610,653 A | 3/1997 | Abecassis |
| 5,614,940 A | 3/1997 | Cobbley |
| 5,619,335 A | 4/1997 | Tsinberg et al. |
| 5,619,337 A | 4/1997 | Naimpally |
| 5,625,464 A | 4/1997 | Compoint et al. |
| 5,629,732 A | 5/1997 | Moskowitz et al. |
| 5,642,171 A | 6/1997 | Baumgartner et al. |
| 5,648,824 A | 7/1997 | Dunn |
| 5,659,539 A | 8/1997 | Porter et al. |
| 5,664,044 A | 9/1997 | Ware |
| 5,668,948 A | 9/1997 | Belknap et al. |
| 5,675,388 A | 10/1997 | Cooper |
| 5,682,488 A | 10/1997 | Gleason et al. |
| 5,684,918 A | 11/1997 | Abecassis |
| 5,692,093 A | 11/1997 | Iggulden |
| 5,696,866 A | 12/1997 | Iggulden |
| 5,696,868 A | 12/1997 | Kim et al. |
| 5,696,869 A | 12/1997 | Abecassis |
| 5,701,383 A | 12/1997 | Russo et al. |
| 5,703,655 A | 12/1997 | Corey |
| 5,706,388 A | 1/1998 | Isaka |
| 5,712,976 A | 1/1998 | Falcon, Jr. et al. |
| D390,839 S | 2/1998 | Yamamoto et al. |
| 5,715,356 A | 2/1998 | Hirayama et al. |
| 5,719,982 A | 2/1998 | Kawamura et al. |
| 5,721,815 A | 2/1998 | Ottesen et al. |
| 5,721,878 A | 2/1998 | Ottesen et al. |
| 5,724,474 A | 3/1998 | Oguro et al. |
| 5,742,730 A | 4/1998 | Couts |
| 5,751,282 A | 5/1998 | Girard et al. |
| 5,751,883 A | 5/1998 | Ottesen et al. |
| 5,761,417 A | 6/1998 | Henley et al. |
| 5,774,170 A | 6/1998 | Hite et al. |
| 5,774,186 A | 6/1998 | Brodsky |
| 5,778,137 A | 7/1998 | Nielsen et al. |
| 5,805,763 A | 9/1998 | Lawler et al. |
| 5,805,821 A | 9/1998 | Saxena et al. |
| 5,808,607 A | 9/1998 | Brady et al. |

(56) References Cited

U.S. PATENT DOCUMENTS

| | | | |
|---|---|---|---|
| 5,815,689 A | 9/1998 | Shaw et al. |
| 5,822,493 A | 10/1998 | Uehara et al. |
| 5,848,217 A | 12/1998 | Tsukagoshi et al. |
| 5,864,682 A | 1/1999 | Porter et al. |
| 5,870,553 A | 2/1999 | Shaw et al. |
| 5,889,915 A | 3/1999 | Newton |
| 5,892,536 A | 4/1999 | Logan |
| 5,892,884 A | 4/1999 | Sugiyama et al. |
| 5,899,578 A | 5/1999 | Yanagihara et al. |
| 5,920,572 A | 7/1999 | Washington et al. |
| 5,930,444 A | 7/1999 | Camhi et al. |
| 5,930,493 A | 7/1999 | Ottesen et al. |
| 5,949,954 A | 9/1999 | Young et al. |
| 5,953,485 A | 9/1999 | Abecassis |
| 5,956,716 A | 9/1999 | Kenner et al. |
| 5,973,679 A | 10/1999 | Abbott et al. |
| 5,987,210 A | 11/1999 | Iggulden |
| 5,995,709 A | 11/1999 | Tsuge |
| 5,999,688 A | 12/1999 | Iggulden |
| 5,999,691 A | 12/1999 | Takagi et al. |
| 6,002,832 A | 12/1999 | Yoneda |
| 6,005,562 A | 12/1999 | Shiga et al. |
| 6,005,564 A | 12/1999 | Ahmad et al. |
| 6,005,603 A | 12/1999 | Flavin |
| 6,011,594 A | 1/2000 | Takashima |
| 6,018,612 A | 1/2000 | Thomason et al. |
| 6,028,599 A | 2/2000 | Yuen et al. |
| 6,055,495 A | 4/2000 | Tucker et al. |
| D424,543 S | 5/2000 | Hodgson |
| 6,057,893 A | 5/2000 | Kojima et al. |
| D426,208 S | 6/2000 | Hodgson |
| D426,209 S | 6/2000 | Hodgson |
| 6,088,455 A | 7/2000 | Logan |
| 6,091,886 A | 7/2000 | Abecassis |
| RE36,801 E | 8/2000 | Logan et al. |
| 6,100,941 A | 8/2000 | Dimitrova et al. |
| 6,112,226 A | 8/2000 | Weaver et al. |
| 6,138,147 A | 10/2000 | Weaver et al. |
| 6,151,444 A | 11/2000 | Abecassis |
| 6,163,644 A | 12/2000 | Owashi et al. |
| 6,167,083 A | 12/2000 | Sporer et al. |
| 6,169,843 B1 | 1/2001 | Lenihan et al. |
| 6,192,189 B1 | 2/2001 | Fujinami et al. |
| 6,198,877 B1 | 3/2001 | Kawamura et al. |
| 6,208,804 B1 | 3/2001 | Ottesen et al. |
| 6,208,805 B1 | 3/2001 | Abecassis |
| 6,226,447 B1 | 5/2001 | Sasaki et al. |
| 6,232,926 B1 | 5/2001 | Nguyen |
| 6,233,389 B1 | 5/2001 | Barton |
| 6,243,676 B1 | 6/2001 | Witteman |
| 6,278,837 B1 | 8/2001 | Yasukohchi et al. |
| 6,285,824 B1 | 9/2001 | Yanagihara et al. |
| 6,304,714 B1 | 10/2001 | Krause et al. |
| 6,330,675 B1 | 12/2001 | Wiser et al. |
| 6,335,730 B1 | 1/2002 | Gould |
| 6,341,195 B1 | 1/2002 | Mankovitz et al. |
| D454,574 S | 3/2002 | Wasko et al. |
| 6,400,407 B1 | 6/2002 | Zigmond et al. |
| 6,408,128 B1 | 6/2002 | Abecassis |
| 6,424,791 B1 | 7/2002 | Saib |
| 6,425,127 B1 | 7/2002 | Bates et al. |
| 6,445,738 B1 | 9/2002 | Zdepski et al. |
| 6,445,872 B1 | 9/2002 | Sano et al. |
| 6,452,615 B1 | 9/2002 | Chiu et al. |
| 6,490,000 B1 | 12/2002 | Schaefer et al. |
| 6,498,894 B2 | 12/2002 | Ito et al. |
| 6,504,990 B1 | 1/2003 | Abecassis |
| D470,153 S | 2/2003 | Billmaier et al. |
| 6,529,685 B2 | 3/2003 | Ottesen et al. |
| 6,542,695 B1 | 4/2003 | Akiba et al. |
| 6,553,178 B2 | 4/2003 | Abecassis |
| 6,574,594 B2 | 6/2003 | Pitman |
| 6,677,967 B2 | 1/2004 | Sawano et al. |
| 6,698,020 B1 | 2/2004 | Zigmond |
| 6,701,355 B1 | 3/2004 | Brandt et al. |
| 6,718,551 B1 | 4/2004 | Swix |
| 6,760,017 B1 | 7/2004 | Banerjee et al. |
| 6,772,196 B1 | 8/2004 | Kirsch et al. |
| 6,788,882 B1 | 9/2004 | Geer et al. |
| D499,740 S | 12/2004 | Ombao et al. |
| 6,850,691 B1 | 2/2005 | Stam et al. |
| 6,871,006 B1 | 3/2005 | Oguz et al. |
| 6,931,451 B1 | 8/2005 | Logan |
| 6,978,470 B2 | 12/2005 | Swix |
| 7,032,177 B2 | 4/2006 | Novak |
| 7,032,179 B2 | 4/2006 | Mack et al. |
| D521,521 S | 5/2006 | Jewitt et al. |
| 7,055,166 B1 | 5/2006 | Logan |
| 7,058,376 B2 | 6/2006 | Logan |
| 7,072,849 B1 | 7/2006 | Filepp et al. |
| 7,110,658 B1 | 9/2006 | Iggulden |
| 7,187,884 B2 | 3/2007 | Bardolatzy et al. |
| 7,197,758 B1 | 3/2007 | Blackketter et al. |
| D539,809 S | 4/2007 | Totten et al. |
| 7,243,362 B2 | 7/2007 | Swix |
| 7,251,413 B2 | 7/2007 | Dow |
| 7,266,832 B2 | 9/2007 | Miller |
| 7,272,298 B1 | 9/2007 | Lang et al. |
| D554,140 S | 10/2007 | Armendariz |
| D558,220 S | 12/2007 | Maitlen et al. |
| 7,319,761 B2 | 1/2008 | Bianchi et al. |
| 7,320,137 B1 | 1/2008 | Novak |
| 7,376,469 B2 | 5/2008 | Eischeid et al. |
| 7,430,360 B2 | 9/2008 | Abecassis |
| D596,646 S | 7/2009 | Wani |
| D604,308 S | 11/2009 | Takano |
| 7,631,331 B2 | 12/2009 | Sie |
| 7,634,785 B2 | 12/2009 | Smith |
| 7,661,121 B2 | 2/2010 | Smith |
| 7,779,438 B2 | 8/2010 | Davies |
| 7,801,910 B2 | 9/2010 | Houh et al. |
| 7,889,964 B1 | 2/2011 | Barton et al. |
| 8,156,520 B2 | 4/2012 | Casagrande et al. |
| 8,352,981 B1 * | 1/2013 | Oztaskent ............... G06Q 30/02 725/34 |
| 8,468,056 B1 | 6/2013 | Chalawsky |
| 8,606,085 B2 | 12/2013 | Gratton |
| 8,701,145 B1 * | 4/2014 | Berger ............... H04N 21/4331 725/86 |
| 8,726,309 B2 | 5/2014 | Casagrande et al. |
| 9,183,885 B2 | 11/2015 | Casagrande et al. |
| 2002/0069218 A1 | 6/2002 | Sull et al. |
| 2002/0088010 A1 | 7/2002 | Dudkiewicz et al. |
| 2002/0090198 A1 | 7/2002 | Rosenberg |
| 2002/0092017 A1 | 7/2002 | Klosterman |
| 2002/0092022 A1 | 7/2002 | Dudkicwicz |
| 2002/0097235 A1 | 7/2002 | Rosenberg |
| 2002/0120925 A1 | 8/2002 | Logan |
| 2002/0124249 A1 | 9/2002 | Shintani et al. |
| 2002/0131511 A1 | 9/2002 | Zenoni |
| 2002/0169540 A1 | 11/2002 | Engstrom |
| 2002/0184047 A1 | 12/2002 | Plotnick |
| 2003/0005052 A1 | 1/2003 | Feuer |
| 2003/0031455 A1 | 2/2003 | Sagar |
| 2003/0031458 A1 | 2/2003 | Takahashi |
| 2003/0066078 A1 | 4/2003 | Bjorgan |
| 2003/0084451 A1 | 5/2003 | Pierzga |
| 2003/0093790 A1 | 5/2003 | Logan |
| 2003/0121037 A1 | 6/2003 | Swix et al. |
| 2003/0154128 A1 | 8/2003 | Liga |
| 2003/0192060 A1 | 10/2003 | Levy |
| 2003/0194213 A1 | 10/2003 | Schultz et al. |
| 2003/0202773 A1 | 10/2003 | Dow |
| 2003/0231854 A1 | 12/2003 | Derrenberger |
| 2004/0010807 A1 | 1/2004 | Urdang |
| 2004/0040042 A1 | 2/2004 | Feinleib |
| 2004/0049780 A1 | 3/2004 | Gee |
| 2004/0083484 A1 | 4/2004 | Ryal |
| 2004/0172650 A1 | 9/2004 | Hawkins et al. |
| 2004/0177317 A1 | 9/2004 | Bradstreet |
| 2004/0189873 A1 | 9/2004 | Konig |
| 2004/0190853 A1 | 9/2004 | Dow |
| 2004/0226035 A1 | 11/2004 | Hauser, Jr. |
| 2004/0244035 A1 | 12/2004 | Wright et al. |

(56) References Cited

U.S. PATENT DOCUMENTS

| | | |
|---|---|---|
| 2004/0255330 A1 | 12/2004 | Logan |
| 2004/0255334 A1 | 12/2004 | Logan |
| 2004/0255336 A1 | 12/2004 | Logan |
| 2004/0261100 A1* | 12/2004 | Huber .............. H04N 7/163 725/32 |
| 2005/0005308 A1 | 1/2005 | Logan |
| 2005/0020223 A1 | 1/2005 | Ellis et al. |
| 2005/0025469 A1 | 2/2005 | Geer et al. |
| 2005/0044561 A1 | 2/2005 | McDonald |
| 2005/0076359 A1 | 4/2005 | Pierson et al. |
| 2005/0081252 A1 | 4/2005 | Chefalas |
| 2005/0114214 A1 | 5/2005 | Itoh |
| 2005/0132418 A1 | 6/2005 | Barton et al. |
| 2005/0262539 A1 | 11/2005 | Barton |
| 2006/0013555 A1 | 1/2006 | Poslinski |
| 2006/0015925 A1 | 1/2006 | Logan |
| 2006/0059426 A1 | 3/2006 | Ogikubo |
| 2006/0115058 A1 | 6/2006 | Alexander et al. |
| 2006/0143567 A1 | 6/2006 | Chiu et al. |
| 2006/0168630 A1 | 7/2006 | Davies |
| 2006/0218617 A1 | 9/2006 | Bradstreet |
| 2006/0277569 A1 | 12/2006 | Smith |
| 2006/0280437 A1 | 12/2006 | Logan |
| 2006/0288374 A1 | 12/2006 | Ferris |
| 2006/0288392 A1 | 12/2006 | Fleming |
| 2007/0050827 A1 | 3/2007 | Gibbon |
| 2007/0098357 A1 | 5/2007 | McEnroe et al. |
| 2007/0101394 A1 | 5/2007 | Fu et al. |
| 2007/0113250 A1 | 5/2007 | Logan |
| 2007/0118873 A1 | 5/2007 | Houh et al. |
| 2007/0124758 A1 | 5/2007 | Sung |
| 2007/0136742 A1 | 6/2007 | Sparrell |
| 2007/0156739 A1 | 7/2007 | Black |
| 2007/0168543 A1 | 7/2007 | Krikorian |
| 2007/0199013 A1 | 8/2007 | Samari et al. |
| 2007/0204288 A1 | 8/2007 | Candelore |
| 2007/0212030 A1 | 9/2007 | Koga et al. |
| 2007/0214473 A1 | 9/2007 | Barton |
| 2007/0276926 A1 | 11/2007 | Lajoie |
| 2007/0277564 A1 | 12/2007 | Siig |
| 2007/0300249 A1 | 12/2007 | Smith et al. |
| 2007/0300250 A1 | 12/2007 | Smith et al. |
| 2007/0300258 A1 | 12/2007 | O'Connor |
| 2008/0013927 A1 | 1/2008 | Kelly et al. |
| 2008/0036917 A1 | 2/2008 | Pascarella |
| 2008/0052739 A1 | 2/2008 | Logan |
| 2008/0059997 A1 | 3/2008 | Plotnick et al. |
| 2008/0092168 A1 | 4/2008 | Logan et al. |
| 2008/0112690 A1 | 5/2008 | Shahraray et al. |
| 2008/0155627 A1 | 6/2008 | O'Connor |
| 2008/0183587 A1 | 7/2008 | Joo et al. |
| 2008/0196060 A1 | 8/2008 | Varghese |
| 2008/0250450 A1 | 10/2008 | Lamer et al. |
| 2008/0267584 A1 | 10/2008 | Green |
| 2008/0276266 A1 | 11/2008 | Huchital et al. |
| 2008/0304809 A1 | 12/2008 | Haberman |
| 2009/0006191 A1 | 1/2009 | Arankalle et al. |
| 2009/0077580 A1 | 3/2009 | Konig et al. |
| 2009/0093278 A1 | 4/2009 | Negron et al. |
| 2009/0129747 A1 | 5/2009 | Casagrande |
| 2009/0133092 A1 | 5/2009 | Casagrande |
| 2009/0133093 A1 | 5/2009 | Hodge |
| 2009/0238536 A1 | 9/2009 | Gratton |
| 2009/0271826 A1 | 10/2009 | Lee et al. |
| 2009/0299843 A1 | 12/2009 | Shkedi |
| 2009/0300699 A1 | 12/2009 | Casagrande et al. |
| 2009/0303040 A1 | 12/2009 | Casagrande et al. |
| 2009/0304358 A1 | 12/2009 | Rashkovskiy |
| 2010/0031162 A1 | 2/2010 | Wiser et al. |
| 2010/0043022 A1* | 2/2010 | Kaftan .............. H04N 21/235 725/34 |
| 2010/0053452 A1 | 3/2010 | Abe et al. |
| 2010/0138761 A1 | 6/2010 | Barnes |
| 2010/0158484 A1 | 6/2010 | Casagrande et al. |
| 2010/0162291 A1 | 6/2010 | Casagrande et al. |
| 2010/0162344 A1 | 6/2010 | Casagrande et al. |
| 2010/0274628 A1 | 10/2010 | Kunz et al. |
| 2010/0322592 A1 | 12/2010 | Casagrande |
| 2011/0194838 A1 | 8/2011 | Meijer |
| 2011/0197224 A1 | 8/2011 | Meijer |
| 2011/0200300 A1 | 8/2011 | Barton et al. |
| 2012/0056911 A1 | 3/2012 | Safaee-Rad et al. |
| 2012/0057847 A1 | 3/2012 | Casagrande |
| 2012/0057848 A1 | 3/2012 | Casagrande |
| 2012/0159537 A1 | 6/2012 | Casagrande et al. |
| 2014/0105567 A1* | 4/2014 | Casagrande ....... H04N 21/4888 386/230 |
| 2014/0373043 A1* | 12/2014 | Rose .............. H04H 20/38 725/32 |
| 2018/0192161 A1* | 7/2018 | Gerba .............. H04N 21/4314 |

FOREIGN PATENT DOCUMENTS

| | | |
|---|---|---|
| EP | 785675 | 7/1997 |
| EP | 2061239 A2 | 5/2009 |
| GB | 2320637 | 6/1998 |
| JP | 06-233234 | 8/1994 |
| JP | 06-245157 | 9/1994 |
| JP | 07-111629 | 4/1995 |
| JP | 07-131754 | 5/1995 |
| JP | 07-250305 | 9/1995 |
| JP | 07-264529 | 10/1995 |
| JP | 2001 359079 | 12/2001 |
| JP | 2003153114 | 5/2003 |
| JP | 2006 262057 | 9/2006 |
| JP | 2008131150 A | 6/2008 |
| WO | WO 92/22983 | 12/1992 |
| WO | WO 95/32584 | 11/1995 |
| WO | 2002023903 A | 3/2002 |

OTHER PUBLICATIONS

TIVO "TIVO Launches Remote Scheduling With Verizon Wireless," Mar. 14, 2007.

Pogue, David "Networks Start to Offer TV on the Web" The New York Times, Oct. 18, 2007; retrieved from the Internet at http://www.nytimes.com/007/10/18/technology/circuits/18pogue.html?pagewanted=print on Aug. 1, 2012.

Satterwhite Brandon et al. "Automatic Detection of TV Commercials" IEEE Potentials, Apr./May 2004.

Dimitrova, N., et al, "Real Time Commercial Detection Using MPEG Features", Philips Research.

"*Paramount Pictures Corp.* v. *ReplayTV & SonicBlue*", http://www.eff.org/IP/Video/Paramount v. ReplayTV/20011031_complaint.html, Complaint Filed, (Oct. 30, 2001).

Manjoo, Farhad, "They Know What You're Watching", Wired News, http://www.wired.com/news/politics/0.1283.52302.00.html, (May 2, 2002).

Haughey, Matt, "EFF's ReplayTV Suit Ends", http://www.pvrblog.com/pvr/2004/01/effs_replaytv_s.html, (Jan. 12, 2004).

Mizutani, Masami, et al, "Commercial Detection in Heterogeneous Video Streams Using Fused Multi-Modal and Temporal Features", IEEE ICASSP, 2005, Philadelphia, (Mar. 22, 2005).

Tew, Chris, "How MythTV Detects Commercials", http://www.pvrwire.com/2006/10/27/how-mythtv-detects-commercials/, (Oct. 27, 2006).

RCA, "RCA DRC8060N DVD Recorder", http://www.pricegrabber.com/rating_getprodrev.php/product_id=12462074/id, PriceGrabber.com, (Jan. 26, 2007).

"How to Write a New Method of Commercial Detection", MythTV, http://www.mythtv.org/wiki/index.php/How to Write a New Method of Commercial Detection, (Jan. 26, 2007).

"Comskip", http://www.kaashoek.com/comskip/, commercial detector, (Jan. 26, 2007).

OA mailed on May 24, 2010 for U.S. Appl. No. 11/942,896, filed Nov. 20, 2007 in the name of Hodge.

ISR for PCT/US2009/037183 mailed on Jul. 15, 2009.

* cited by examiner

AUTOMATED COMMERCIAL CONTENT SHIFTING IN A VIDEO STREAMING SYSTEM

TECHNICAL FIELD

The following discussion generally relates to video streaming systems. More particularly, the following discussion relates to commercial content switching in video streaming systems.

BACKGROUND

Media content, including video-on-demand (VOD) and television (TV) programming, has traditionally been delivered to viewers over legacy cable and satellite broadcast systems. More recently, various streaming video platforms have been introduced by media content providers and gained widespread commercial adoption; the term "media content provider," as appearing herein, encompassing all types of media content sources, aggregators, and the like from which content-containing digital or analog signals can be obtained for viewing on user devices. The term "media content providers" thus encompasses cable, satellite, and over-the-top (OTT) TV providers, as well as entities owning or operating streaming video platforms. It is also now commonplace for end users to placeshift media content stored in memory contained in or accessible to a home media receiver, such as an STB located at the end user's residence, over a network for viewing on a smartphone, tablet, or other portable media receiver operated by the end user.

There is a long standing desire to increase the potential revenue generated by such streaming systems. For example, by increasing the value of ads presented to the users of such systems. Thus, there remains a continuing desire to provide systems and methods that improve the delivery of commercial content to the users of such systems. Other desirable features and characteristics will become apparent from the subsequent detailed description and the appended claims, taken in conjunction with the accompanying drawings and this background section.

BRIEF SUMMARY

The various embodiments descried herein provide systems, devices and/or processes to improve the delivery of commercial content in a video streaming system. The various embodiments described herein facilitate the replacement of commercial content by providing the ability to shift the timing of the video stream in a way that allows commercials to be replaced with other commercials having different timespans. For example, in one embodiment a program channel is monitored to detect commercial content that has a first timespan. This detected commercial content is replaced with other commercial content that has a second timespan different than the first timespan. To compensate for this difference in timespans the timing of the video stream is adjusted. This adjustment in timing allows the replacement of commercial content with commercial content that is longer or shorter than the original commercial content. This provides increased flexibility in replacing commercial content, and this increased flexibility can result in increased revenue from the replacement. Furthermore, it can make such a replacement transparent to a user by preventing disruptions in video stream as transmitted and displayed to the user.

Other embodiments facilitate the improved delivery of commercial content in a video streaming system by providing the ability to shift content in a way that allows multiple relatively short commercials to be replaced with one or more longer commercials. Specifically, these various embodiments facilitate the replacement of relatively short commercial content by providing the ability to shift the timing of the video stream in a way that allows multiple relatively short commercials to be replaced with one or more longer commercials. Notably, this replacement can occur even when the two shorter pieces of commercial content were not adjacent in time in the video stream.

In one example embodiment, an automated process is executable by a streaming server in communication with a video player device over a network. In such an embodiment the automated process comprises: streaming a program channel as a video stream from the streaming server to the video player device; monitoring the program channel to detect first commercial content in the program channel having a first timespan; and responsive to detecting the first commercial content in the program channel, replacing the detected first commercial content in the video stream with replacement commercial content having a second timespan, where the first timespan is different than the second timespan; adjusting timing of the video stream to compensate for a difference in the first timespan and the second timespan.

A further example may be implemented wherein the automated process further comprises monitoring the program channel to detect additional commercial content in the program channel having a third timespan. A further example may be implemented wherein the step of adjusting timing of the video stream to compensate for the difference in the first timespan and the second timespan comprises: responsive to detecting additional commercial content in the program channel, skipping the detected additional commercial content in the video stream to compensate for a difference in the first timespan and the second timespan.

In a further example the first commercial content comprises a program promotion for a future program. In yet a further example, the monitoring the program channel to detect first commercial content in the program channel having the first timespan comprises tracking a number of times the first commercial content has been viewed by a user. In yet a further example, the monitoring the program channel to detect first commercial content in the program channel having the first timespan comprises comparing content in the program channel to previously identified commercials.

In a further example the monitoring the program channel to detect first commercial content in the program channel having the first timespan comprises monitoring for identification tags provided by a program channel provider. In yet a further example the streaming the program channel comprises streaming from a digital video recorder (DVR) that includes a recording of the program channel. In yet a further example the streaming the program channel comprises streaming the program channel as linear programming as received from a content source. In yet a further example the replacement commercial content is selected based at least in part on demographics of a user. In yet a further example the replacement commercial content is selected based at least in part on a time and date of the streaming of the program channel to the video player device.

In another example embodiment, an automated process is executable by a streaming server in communication with a video player device over a network. In such an embodiment the automated process comprises: streaming a program channel as a video stream from the streaming server to the video player device; monitoring the program channel to detect first commercial content in the program channel, wherein the first commercial content comprises a program promotion for a future program and has a first timespan less than a threshold; responsive to detecting first commercial content in the program channel, replacing the detected first commercial content in the video stream with replacement commercial content having a second timespan greater than the threshold; monitoring the program channel to detect additional commercial content in the program channel, wherein the additional commercial content comprises a program promotion for a future program and has a third timespan less than the threshold; and responsive to detecting additional commercial content in the program channel, skipping the detected additional commercial content in the video stream to compensate for a difference in the first timespan and the second timespan.

In yet another example embodiment, a streaming server is in communication with a video player device over a network, the streaming server comprising a processor and a memory, wherein the processor is configured to perform an automated process by executing digital instructions stored in the memory, wherein the automated process comprises: streaming a program channel as a video stream from the streaming server to the video player device; monitoring the program channel to detect first commercial content in the program channel having a first timespan less than a threshold; responsive to detecting the first commercial content in the program channel, replacing the detected first commercial content in the video stream with replacement commercial content having a second timespan greater than the threshold; and adjusting timing of the video stream to compensate for a difference in the first timespan and the second timespan.

In a further example, the automated processes further comprises monitoring the program channel to detect additional commercial content in the program channel having a third timespan less than the threshold. In yet a further example, the step of adjusting timing of the video stream to compensate for the difference in the first timespan and the second timespan comprises: responsive to detecting additional commercial content in the program channel, skipping the detected additional commercial content in the video stream to compensate for a difference in the first timespan and the second timespan.

In a further example, the first commercial content comprises a program promotion for a future program. In yet a further example, the monitoring the program channel to detect first commercial content in the program channel having the first timespan less than the threshold further comprises tracking a number of times the first commercial content has been viewed by a user.

In a further example, the monitoring the program channel to detect first commercial content in the program channel having the first timespan less than the threshold comprises comparing content in the program channel to previously identified commercials having the first timespan less than the threshold. In yet a further example, the monitoring the program channel to detect first commercial content in the program channel having the first timespan less than the threshold comprises monitoring for identification tags provided by a program channel provider. In yet a further example, the replacement commercial content is selected based at least in part on demographics of a user.

Various additional examples, aspects and other features are described in more detail below.

BRIEF DESCRIPTION OF THE DRAWING FIGURES

Exemplary embodiments will hereinafter be described in conjunction with the following drawing figures, wherein like numerals denote like elements, and.

DETAILED DESCRIPTION

The following detailed description of the invention is intended to provide various examples, but it is not intended to limit the invention or the application and uses of the invention. Furthermore, there is no intention to be bound by any theory presented in the preceding background or the following detailed description.

The various embodiments described herein facilitate the replacement of commercial content by providing the ability to shift the timing of the video stream in a way that allows commercials to be replaced with other commercials having different timespans. For example, in one embodiment a program channel is monitored to detect commercial content that has a first timespan. This detected commercial content is replaced with other commercial content that has a second timespan different than the first timespan. To compensate for this difference in timespans the timing of the video stream is adjusted. This adjustment in timing allows the replacement of commercial content with commercial content that is longer or shorter than the original commercial content. This provides increased flexibility in replacing commercial content, and this increased flexibility can result in increased revenue from the replacement. Furthermore, it can make such a replacement transparent to a user by preventing disruptions in video stream as transmitted and displayed to the user.

For example, a 28 second commercial can be replaced with a 30 second commercial by shifting the program content back 2 seconds, thus introducing an additional 2 second delay in the video stream. Conversely, 35 second commercial can be replaced with a 20 second commercial by shifting the program content forward 15 seconds, thus reducing the delay by 15 seconds. In each case, the timing of the video stream is adjusted to facilitate the replacement of commercial content in a way that provides increased flexibility. Such embodiments can have particular applicability for program channels that originate from other countries where commercials commonly have different, non-standard timespans. Specifically, such embodiments can allow commercials with non-standard timespans to be replaced with longer or shorter commercials that have more standard timespans.

Some embodiments described herein facilitate replacement of relatively short commercial content by providing the ability to shift the timing of the video stream in a way that allows multiple relatively short commercials to be replaced with one or more longer commercials. For example, in one embodiment a program channel is monitored to detect commercial content that has a timespan less than a threshold amount. This detected relatively short commercial content is replaced with relatively longer commercial content that has a timespan greater than the threshold amount. Stated another way, a shorter advertisement is replaced with a longer advertisement. Because the replacement commercial content has a longer timespan than the originally detected commercial content, this replacement of the first commercial content with the replacement commercial content introduces a delay in the video stream relative to the original content. This introduced delay relative to the original content can be undesirable in many circumstances. To compensate for this introduced delay, the timing of the video stream is adjusted to compensate for the difference in the timespan of the original commercial content and the timespan of the replacement commercial content.

In one embodiment, this adjustment is performed by monitoring the program channel to detect later commercial content that also has a timespan less than the threshold amount and then skipping the later detected commercial content with the shorter timespan. Skipping the later detected commercial content reduces the delay in the video stream, and thus compensates for the difference in the timespan of the original commercial content and the replacement commercial content. Taken together these actions effectively result in two or more shorter pieces of commercial content being replaced with a single longer piece of commercial content. Notably, this replacement can occur even when the two shorter pieces of commercial content were not adjacent in time in the video stream.

These various embodiments are particularly applicable to replacing certain time-sensitive commercials such as program promotions. In general, program promotions are commercials for future programs, including programs that will be aired (e.g., broadcast, transmitted, streamed) in the near or immediate future. As such, these program promotions have limited value initially, and can have almost no value after the future program content has already been aired. However, these program promotions are frequently shorter than traditional commercials, and as such they cannot be easily replaced with regular commercial content.

The embodiments described herein facilitate the replacement of program promotions with longer, and in many cases more valuable commercial content. In such an embodiment a program channel is monitored to detect a first program promotion that has a timespan less than a threshold amount. This detected program promotion is replaced with relatively longer commercial content that has a timespan greater than the threshold amount. Thus, the relatively short program promotion is replaced with a longer advertisement. Because the replacement commercial content has a longer timespan than the originally detected program promotion, this replacement of the program promotion with the replacement commercial content again introduces a delay in the video stream relative to the original content. To compensate for this introduced delay the program channel is monitored to detect another program promotion or other later commercial content that also has a timespan less than the threshold amount. This later detected program promotion in the program channel is then skipped. Again, skipping the later detected program promotion reduces or even eliminates the delay in the video stream, and thus compensates for the difference in the timespan of the original program promotion and the replacement commercial content. Taken together these actions effectively allow two or more program promotions to be replaced with a single longer, and more valuable, piece of commercial content. Notably, this replacement can occur even when the two program promotions were not adjacent in time in the video stream.

Replacing relatively short program promotions with longer traditional commercials can provide several advantages. Specifically, as noted above, in many cases the relatively shorter program promotions can have limited value. First, in most cases program promotions result in no direct revenue for the program channel provider. Instead, program promotions serve only to increase viewership of the later program. And in cases where the advertised program has already aired, even that limited value is greatly diminished. Thus, replacing multiple program promotions with one longer regular commercial can have significant economic value.

The general concepts described herein may be implemented in any video streaming context, but are especially relevant to the streaming of television programming that commonly includes commercials amid live or pre-recorded programming. Of course, equivalent embodiments could be implemented within other contexts, settings or applications as desired.

Figure 1:
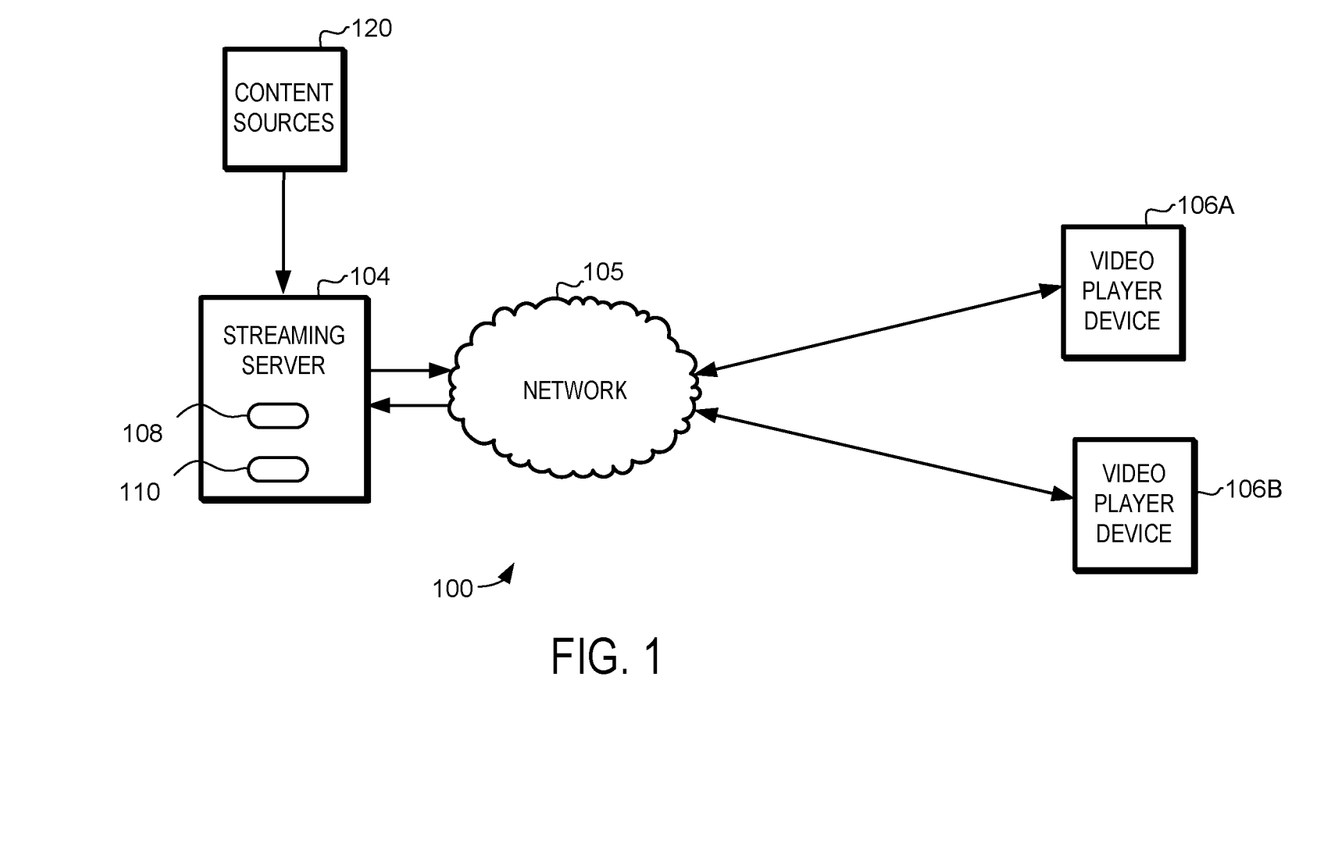
FIG. 1 is a diagram of an example video streaming system that includes a plurality of video player devices.

Turning now to the drawings and with initial reference to FIG. 1, a video streaming system 100 suitably includes a streaming server 104 and a plurality of video player devices 106A-b. In general, the streaming server 104 receives video content from one or more content sources 120, and transmits that video content through the network 105 to the video player devices 106A-b in the form of a video stream that can be received, processed, and displayed at the video player devices 106A-b.

In general, the content sources 120 can be any type of video content source, including media providers, content aggregators or distributors such as a cable television system operator, a direct broadcast satellite (DBS) system operator, or simply a network service provider or the like. These content sources 120 can provide the video content to the streaming server 104 in any suitable form and by any suitable technique. For example, the video content can be provided via satellite, fiber optic or any other conventional wireless or physical media for transmitting signals. The transmitted signals can be received, demodulated and decoded as needed by any appropriate receiver(s) to extract program signals. The extracted programming signals can then be analyzed as appropriate to identify the program contents. A distributor/aggregator, for example, may encode the extracted signals for distribution on a digital network, for aggregation and redistribution of signals over a DBS or cable distribution system, for generating content stored on a remote storage digital video recorder (RSDVR) or video on demand (VOD) service, or for any other purpose.

This content can then be passed to the streaming server 104. Having received this content, the streaming server 104 can encode the received content into a suitable format streaming to the video player devices 106A-B. For example, the streaming server 104 can transmit an encoded video stream via a content delivery network (CDN) for distribution on network 105 (e.g., the Internet) as part of an RSDVR, VOD or other video streaming service. The video streams are thus transmitted to the video player devices 106A-b.

In some embodiments the content sources 120 and/or streaming server 104 can include content identification logic that can identify some specific types of content in the video content. For example, in some embodiments the streaming server 104 is implemented to identify commercial content and/or live content and encode corresponding identifying information into the video streams transmitted to the video player devices 106A-B. Detailed examples of such content identification techniques will be described in greater detail below with reference to FIG. 3.

In general, each of the video player devices 106A-B includes a combination of hardware and/or software needed to receive, process, and play the video streams received from the streaming server 104. As examples, each of the video player devices 106A-B can be implemented to include a streaming application stored in memory and being executed by a suitable processor. As some specific examples, each of the video player devices 106A-B can be implemented with any suitable computing device, including laptops, tablets, virtual reality (VR) devices, and mobile communication devices (e.g., smart phones). Such devices may include an integrated display screen, or may be coupled to a separate display screen.

In one example embodiment, the video streaming system 100 is implemented to perform one or more automated processes during the streaming of video content from the streaming server 104 to the plurality of video player devices 106A-B. In general, these automated processes provide for the improved delivery of commercial content in the video streaming system 100 by facilitating the replacement of commercial content in a way that allows multiple relatively short commercials to be replaced with one or more longer commercials. For example, in one embodiment a program channel is monitored at the streaming server 104 to detect commercial content that has a timespan less than a threshold amount 108. This detected relatively short commercial content is replaced with relatively longer commercial content 110 that has a timespan greater than the threshold amount 108. Stated another way, a shorter advertisement is replaced with a longer advertisement. Because the replacement commercial content 110 has a longer timespan than the originally detected commercial content, this replacement of the first commercial content with the replacement commercial content 110 introduces a delay in the video stream relative to the original content. This introduced delay relative to the original content can be undesirable in many circumstances. To compensate for this introduced delay, the timing of the video stream is adjusted to compensate for the difference in the timespan of the original commercial content and the timespan of the replacement commercial content 110.

In one embodiment, the streaming server 104 performs this adjustment by monitoring the program channel to detect later commercial content that also has a timespan less than the threshold amount 108 and then skipping the later detected commercial content with the shorter timespan. Skipping the later detected commercial content reduces the delay in the video stream, and thus compensates for the difference in the timespan of the original commercial content and the replacement commercial content. Taken together these actions effectively result in two or more shorter pieces of commercial content being replaced with a single longer piece of commercial content. Notably, this replacement can occur even when the two shorter pieces of commercial content were not adjacent in time in the video stream.

In one example embodiment, an automated process is executable by the streaming server 104 in communication with the video player device 106A-B. In such an embodiment the automated process can comprise: streaming a program channel as a video stream from the streaming server 104 to the video player device 106A-B; monitoring the program channel to detect first commercial content in the program channel; and responsive to detecting the first commercial content in the program channel, replacing the detected first commercial content in the video stream with replacement commercial content no having a second timespan different than the first timespan; and adjusting timing of the video stream to compensate for a difference in the first timespan and the second timespan.

In another example embodiment, an automated process is executable by the streaming server 104 in communication with the video player device 106A-B. In such an embodiment the automated process can comprise: streaming a program channel as a video stream from the streaming server 104 to the video player device 106A-B; monitoring the program channel to detect first commercial content in the program channel having a first timespan less than a threshold 108; and responsive to detecting the first commercial content in the program channel, replacing the detected first commercial content in the video stream with replacement commercial content no having a second timespan greater than the threshold 108; adjusting timing of the video stream to compensate for a difference in the first timespan and the second timespan.

Such automated processes can be extended to include monitoring the program channel to detect additional commercial content in the program channel having a third timespan less than the threshold 108. The step of adjusting timing of the video stream can then comprise: responsive to detecting additional commercial content in the program channel, skipping the detected additional commercial content in the video stream to compensate for a difference in the first timespan and the second times.

In such embodiments, the first commercial content can comprise a program promotion for a future program. Likewise, the additional commercial content can comprise a program promotion for a future program.

In one embodiment, the monitoring the program channel to detect first commercial content in the program channel having a first timespan less than a threshold can be performed by comparing content in the program channel to previously identified commercial content. Such a comparison can be performed in real-time as content is received and processed by the streaming server. This allows the comparison to be performed before the content is streamed to the video player device 106A-B. Such a real-time identification of commercial content can enable the replacement of the identified commercial content with longer replacement commercial content without a noticeable disruption to the viewer. Furthermore, by using data from previous identification of the commercial content the precise timespan of the commercial content can be known in advance, enabling the shifting of the video stream to accommodate the longer replacement commercial content.

In another such an embodiment, the monitoring the program channel to detect first commercial content in the program channel having a first timespan less than a threshold can be performed by monitoring for identification tags in the program channel provided by the program provider. In such an embodiment the program provider facilitates the identification of the commercial content by inserting the identification tags into the video stream.

In one embodiment, the streaming of the program channel 114 comprises streaming linear programming, where "linear programming" is defined as content that is received from the content sources 120 and then immediately streamed to the video player devices 106A-B with only relatively small delays for processing. As such, linear programming can include broadcast television channel or cable television channel that is received and streamed by the streaming server 104. As such, linear programming can include live programming such as sports or other live events that are recorded and streamed from the streaming server 104 with only minimal delays between the recording of the event and the streaming of the event as linear programming. In some embodiments this linear programming can be provided with the ability to "lookback" for a predetermined amount of time. In other embodiments, the streaming of the program channel 114 comprises streaming from a digital video recording of the program channel 114. For example, the streaming of the program channel 114 can comprise streaming from an RSDVR that operates with the streaming server 104 and has previously recorded the content of the program channel 114 for later streaming to the video player devices 106A-B.

In one embodiment, the replacement commercial content is selected based at least in part on the demographics of the user of the video player device 106A-B. For example, the commercial content can be selected based on age, gender, familial status, employment, and location of the user to the extent that such details are known. In other embodiments the commercial content can be selected based on previously determined program viewing habits of the user. Other factors such as internet history and shopping history can also be used when known. Additionally, the specific time and date of the streaming of the program channel can be used to select the advertisements.

In another embodiment, the video streaming system 100 is implemented to perform one or more automated processes that comprises: streaming a program channel as a video stream from the streaming server to the video player device; monitoring the program channel to detect first commercial content in the program channel, wherein the first commercial content comprises a program promotion for a future program and has a first timespan less than a threshold; responsive to detecting first commercial content in the program channel, replacing the detected first commercial content in the video stream with replacement commercial content no having a second timespan greater than the threshold; monitoring the program channel to detect additional commercial content in the program channel, wherein the additional commercial content comprises a program promotion for a future program and has a third timespan less than the threshold; responsive to detecting additional commercial content in the program channel, skipping the detected additional commercial content in the video stream to compensate for a difference in the first timespan and the second timespan.

In this embodiment, these program promotions are relatively short commercials for programs that will be aired (e.g., broadcast, transmitted, streamed) in the near or immediate future. The embodiments described herein facilitate the replacement of these relatively short program promotions with longer advertisements or other commercial content. Replacing these relatively short program promotions with longer advertisements or other commercial content can provide several potential advantages. First, in most cases program promotions result in no direct revenue for the program channel provider. Instead, program promotions serve only to increase viewership of the later program. In cases where a user has already viewed the program promotion even this value is limited. And in cases where the program advertised by the program promotion has already aired, even that limited value is greatly diminished. Thus, replacing multiple program promotions with one longer regular commercial can have significant economic value.

Figure 2:
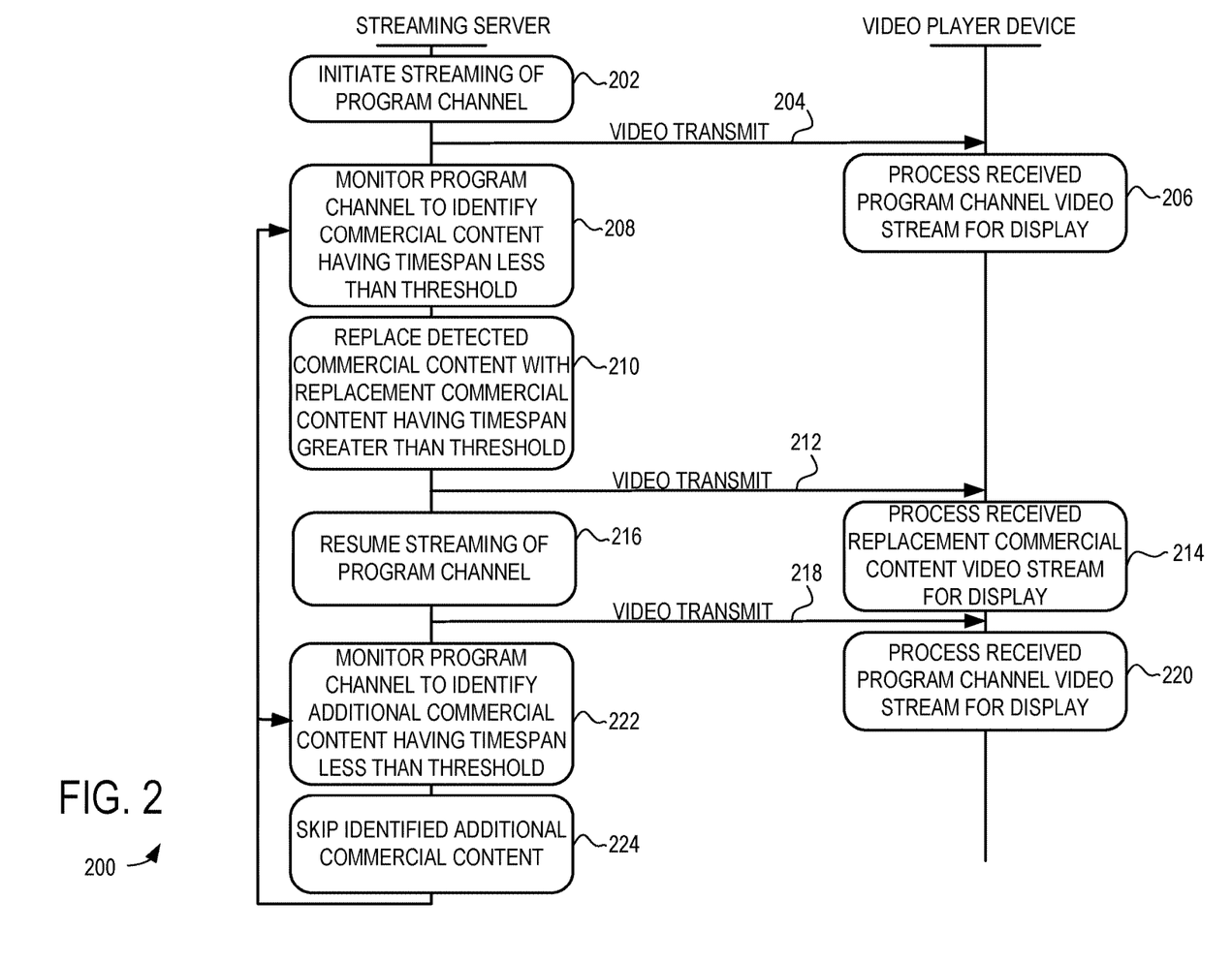
FIG. 2 is a flowchart showing various processes executable by various devices in a streaming media system.

Turning now to FIG. 2, a process flow diagram 200 illustrates various example processes and data flows that can be automatically executed by a streaming server (e.g., streaming server 104) in a video streaming system (e.g., video streaming system 100) that includes one or more video player devices (e.g., video player devices 106A-B). Specifically, the process flow diagram 200 illustrates a process flow between an exemplary streaming server and an exemplary video player device that provides for the automatic replacement of relatively short commercial content in a program channel by providing the ability to shift the timing of the video stream in a way that allows multiple relatively short commercials to be replaced with one or more longer commercials. This process flow is particularly applicable to replacing certain time-sensitive commercials such as program promotions with longer, and more valuable commercial content.

To facilitate the process flow, communications between the various devices can be initiated and established in any suitable manner. For example, communication between the various devices and networks may be established using Internet or other protocols that can include both wireless networking systems (e.g., Wi-Fi) or wired networking systems (e.g., Ethernet or HDMI).

At process step 202 the streaming server initiates a streaming video session and begins transmitting a video stream of a program channel to the video player device using video transmit function 204. In a typical embodiment the streaming server initiates the streaming video session at the direction of the video player device. For example, a streaming application on the video player device can communicate with the streaming server and provide a user interface for initiating a streaming video session of the program channel. Process step 202 and video transmit function 204 can include the encoding and transmitting of the selected program channel from any suitable content source. Additionally, such processing and transmitting can include transmitting using any suitable technique or protocol. As one detailed example, the streaming server can transmit an encoded video stream via a content delivery network for distribution the Internet as part of an RSDVR, VOD or other video streaming service. In these and other such embodiments these videos streams are thus received at the video player devices as input video streams.

At process step 206, the video player device processes the received input video streams of the program channel for display on the video player device. In this process step a streaming application and/or operating system and/or specialized hardware on the video player device performs typical video processing tasks associated with the receiving and displaying of video. For example, these elements can perform various decoding and rendering functions as needed to display the program channel on a video display device.

At process step 208, the streaming server monitors the program channel to identify commercial content having a timespan less than a threshold amount. Thus, while the program channel is being streamed to the video player device the streaming server can identify when commercial content having a timespan less than a threshold amount is being streamed in the program channel. This can include monitoring for program promotions and other types of relatively short commercial content that it is advantageous to replace with longer commercial content.

This process step 208 can be implemented and performed in several different ways. As one example, the monitoring of the program channel can be performed by comparing content in the program channel to previously identified commercial content having a timespan less than a threshold. For example, comparing the content previously identified program promotions. In such an example the audio and/or video content in the program channel can be analyzed to compare the content to previously identified content. To facilitate such a comparison of program content to previously identified commercial content a database of previously identified commercial content can be provided. This database may reside on the streaming server (e.g., streaming server 104) or on separate computing devices.

As one specific example, the program content can be analyzed to recognize scene changes in the program content. When a scene change is identified a digital analysis of the audio and/or video in the new scene is performed to compare the new scene to previously recognized scene's that are stored in the database. If the new scene is found in the database, then a new occurrence of the recognized scene can be recorded in the database. If the scene is not recognized, then a new entry in the database may be created to identify subsequent occurrences of the new scene. To that end, a digital "signature" or "fingerprint" of the new scene can be stored for subsequent analysis.

In process step 208 such a comparison of program content to commercial content can be performed in real-time as content is received and processed by the streaming server. This allows the comparison to be performed and commercial content identified before the content is streamed to the video player device.

In another such embodiment of process step 208, the monitoring of the program channel to identify commercial content can be performed by monitoring for identification tags in the program channel. These identification tags can be inserted in the program content to identify the type of content being streamed in the program channel. Such identification tags can thus be used to identify the various types of content that may be included in the program content, including commercial content. In one example embodiment these tags are provided by the content provider and thus are included in the content when it is received by the streaming server. In such an embodiment the identification tags can be used to identify both the beginning of commercial content and the ending of commercial content.

At process step 210 the detected commercial content is replaced with replacement commercial content having a timespan greater than a threshold amount, and a video stream of the replacement commercial content is transmitted to the video player device using video transmit function 212. Again, process step 210 and video transmit function 212 can include the encoding and transmitting of the selected program channel using any suitable technique or protocol.

Again, this replacement commercial content has a longer timespan than the detected commercial content that it is replacing. For example, a relatively short program promotion can be replacement with a relatively long regular commercial. And as described above, in one embodiment this replacement commercial content is targeted for a user of the video player device. In such an embodiment the replacement commercial content can be selected based at least in part on the demographics of the user of the video player device. For example, the replacement commercial content can be selected based on age, gender, familial status, employment, and location of the user to the extent that such details are known. In other embodiments the replacement commercial content can be selected based on previously determined program viewing habits of the user. Other factors such as purchase history, internet history and location history can also be used when known. Additionally, the specific time and date of the streaming of the program channel can be used to select the replacement commercial content.

In some embodiments, process step 210 is implemented to commercial content only after it has been viewed by a user. For example, this step can be implemented to replace program promotions only after they have been viewed by a user for a predetermined number of times. After a program promotion has been viewed by a user for a number of times it can have very limited value to the program channel provider, and thus the replacement of such commercials can have significant benefit. In such an embodiment the process step 210 would involve the tracking the viewing of program promotions or other commercial content by the user.

It should be noted that the process step 210 does require that the replacement commercial content be inserted into the video stream with the same starting time as the detected commercial content it is replacing. Instead, in some embodiments the detected commercial content is skipped and the replacement commercial content is inserted into the video stream at a later time. For example, the replacement commercial content can be inserted at the end of a current ad block or other desirable location in the video stream. In other embodiments the replacement commercial content is inserted into the video stream before detected commercial content. Such an embodiment can be desirable when the timing of the detected commercial content is known or can be predicted.

At process step 214, the video player device processes the received input video stream of the replacement commercial content for display on the video player device. Again, in this process step a streaming application and/or operating system and/or specialized hardware on the video player device performs typical video processing tasks associated with the receiving and displaying of video.

At process step 216 the streaming server resumes streaming the program channel and resumes transmitting a video stream of a program channel to the video player device using video transmit function 218. Again, process step 216 and video transmit function 218 can include the encoding and transmitting of the selected program channel using any suitable technique or protocol. At process step 220, the video player device processes the received input video stream of the program channel for display on the video player device.

Notably, the resumption of the program channel streaming in process step 216 occurs at ending of the replacement commercial content streaming. Because the replacement commercial content was longer that the commercial content it replaced, this resumption of the program channel streaming is delayed relative to streaming before the replacement. Stated another way, after process step 216 the streaming of the program channel will now be further delayed relative to the timing of the content source. For example, if the original commercial content was a 15 second program promotion, and the replacement commercial content was a standard 30 second commercial, the program channel stream can now be delayed by ~15 additional seconds. This introduced additional delay relative to the content source can be undesirable in many circumstances. For example, it is generally desirable to minimize any delays when streaming live programming. To compensate for this introduced delay, the process flow adjusts the timing of the video stream to compensate for the difference in the timespan of the original commercial content and the timespan of the replacement commercial content with process steps 222 and 224.

At process step 222, the streaming server monitors the program channel to identify additional commercial content having a timespan less than a threshold amount. Thus, while the program channel is again being streamed to the video player device the streaming server can identify when commercial content having a timespan less than a threshold amount is being streamed in the program channel. This can include monitoring for program promotions and other types of relatively short commercial content that it is advantageous to replace with longer commercial content. Like process step 208 described above, this process step 222 can be implemented and performed in several different ways. For example, the monitoring of the program channel can be performed by comparing content in the program channel to previously identified commercial content having a timespan less than a threshold. As another example, the monitoring of the program channel can be performed by monitoring for identification tags in the program channel.

At process step 224 the streaming server skips all or part of the identified additional commercial content. Skipping all or part of the identified additional commercial content at least partially compensates for the for the difference in the timespan of the original commercial content and the timespan of the replacement commercial content. Stated another way, skipping the later detected commercial content reduces the delay in the video stream introduced in process step 210.

Taken together these actions effectively result in two pieces of commercial content being replaced with a single longer piece of commercial content, and notably can be performed even when the two shorter pieces of commercial content are not adjacent in time in the video stream. For example, if the original commercial content was a 15 second program promotion, and the replacement commercial content was a standard 30 second commercial, skipping additional commercial content of 15 seconds will return the video stream to the original delay amount.

The process flow can then return to process step 208 to performed again as desired. However, if the skipping of the additional commercial content performed in step 224 does not sufficiently compensate for the introduced delay, the process flow can return to step 222 to continue monitors the program channel to identify additional commercial content having a timespan less than a threshold amount and skipping such content in step 224 as needed. For example, if the original commercial content was a 15 second program promotion, and the replacement commercial content was a 60 second commercial, and the first detected additional commercial content was another 15 second program promotion, the process flow can repeat steps 222 and 224 until the additional 30 seconds of introduced delay is compensated for by skipping additional identified commercial content.

Thus, the process flow illustrated in FIG. 2 can facilitate the replacement of program promotions with longer, and in many cases more valuable commercial content. Replacing relatively short program promotions with longer traditional commercials can increase provide more interesting program and increased revenue Turning now to FIG. 3 a video streaming system 300 suitably includes a streaming server system 304 and a plurality of video player devices 306A-B. In general, the streaming server system 304 receives video content from one or more content sources 320, and transmits that video content through the network 305 to the video player devices 306A-B in the form of a video stream that can be received, processed, and displayed at the video player devices 306A-B. The video streaming system 300 is an example of the type of system that can be used to facilitate the replacement of commercial content in a way that allows multiple relatively short commercials to be replaced with one or more longer commercials. For example, the video streaming system 300 can be used to implement the process flow illustrated in the process flow diagram 200 of FIG. 2.

Figure 3:
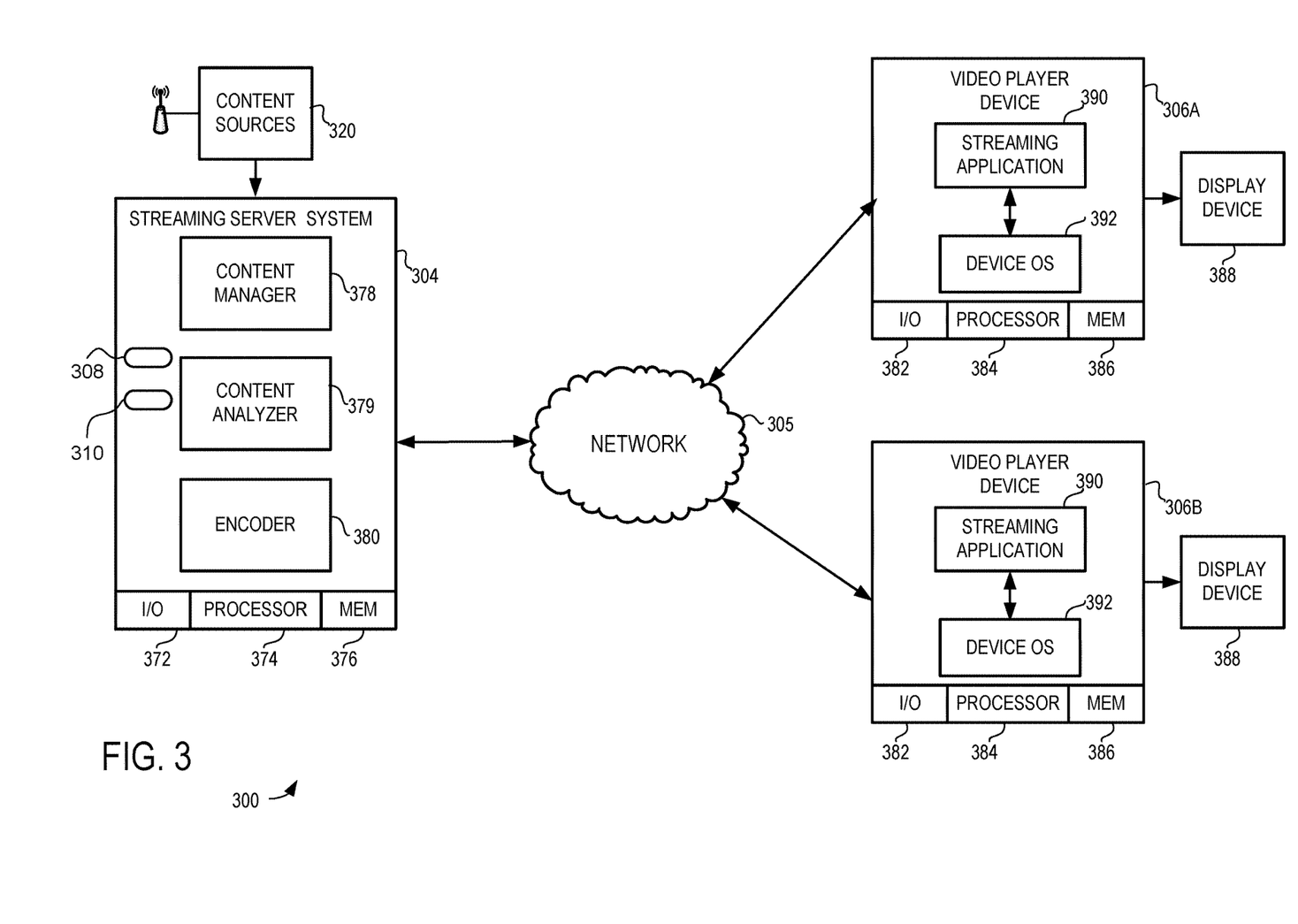
FIG. 3 is a detailed diagram of one example implementation of a streaming media system.

In general, the content sources 320 can be any type of video content source, including media providers, content aggregators or distributors such as a cable television system operator, a direct broadcast satellite (DBS) system operator, or simply a network service provider or the like. The streaming server system 304 processes the received content into a suitable format streaming to the video player devices 306A-B. To facilitate this, the streaming server system 304 includes at least an I/O 372, a processor 374, and a memory 376. Additionally, the streaming server system 304 includes a content manager 378, a content analyzer 379, and an encoder 380.

In general, each of the video player devices 306A-B includes a combination of hardware and/or software needed to receive, process, and play the video streams received from the streaming server system 304. For example, each of the video player devices includes an I/O 382, a processor 384, a memory 386, and a display device 388. Furthermore, each of the video player devices 306A-B includes a streaming application 390 and a device OS 392 residing in memory 386 and being executed by the processor 384. As some specific examples, each of the video player devices 306A-B can be implemented with any suitable computing device, including laptops, tablets and mobile communication devices (e.g., smart phones). Such devices may include an integrated display device 388, or may be coupled to a separate display device 388.

The content sources 320 can include content from a content aggregator or distributor such as a cable television system operator, a direct broadcast satellite (DBS) system operator, a streaming media provider, or simply a network service provider or the like. Other embodiments could provide the features described herein using conventional computing machinery (e.g., physical or cloud based servers) by parties that may or may not be interested in re-distributing the received content, as desired.

In various embodiments, television signals for one or more networks, channels or the like are received in any format by the system operator via satellite, fiber optic or any other conventional wireless or physical media for transmitting television signals. The signals are received, demodulated and decoded as needed by any appropriate receiver(s) to extract program signals that represent the decoded television program stream. Alternately or additionally, content sources 320 may receive content directly from a broadcaster, distributor or other source, as desired.

In a typical embodiment the received programming signals are analyzed as appropriate to identify the program contents. For example, the content analyzer 379 can be implemented to analyze audio and/or video content in the programming signals. Such a system can be used to recognize advertisements (e.g., commercials) or other portions of the underlying content. As described above, such a system can be used to identify program promotions and other relatively short commercial content to facilitate the replacement of such commercial content.

In a typical embodiment, the content analyzer 379 executes a software application that performs the analysis based upon the audio and/or video content received. In various embodiments, content analyzer 379 may consider average zero crossing rate, average spectrum, spectral flatness, prominent tones across a set of frequency bands, bandwidth and/or any other characteristics of the audio or video signal. Other embodiments could equivalently perform a temporal analysis in addition to or in place of frequency analysis. Such a temporal analysis could, for example, identify peak (or peak RMS) values in the time domain signal to find beats (e.g., in music) or other times between peak values that can uniquely identify the content. This temporal analysis could be combined into a fingerprint or signature in any way, or could be considered separately from other factors. Many different audio and video fingerprinting or other automated analysis programs could be used in any number of other embodiments.

The extracted content data may be compared to data previously stored in a database, as appropriate, to identify portions of content in the program stream. Commercials, for example, can be recognized when the audio portions of the program stream contain similar data to known audio data stored in a database. Such a database may make use of conventional database software, or the database may be a custom database developed to store content recognition data, as desired. Such a database may reside on the same computing hardware as the streaming server system 304, or separate computing resources could be provided, including any sort of cloud-based computing resources.

In one specific embodiment, the content analyzer 379 is configured to recognize scene changes in the underlying content. When a different scene is identified in the content analyzer 379 attempts to recognize the scene based upon digital analysis of the audio and/or video. If the scene already exists in the database, then a new occurrence of the recognized scene can be recorded in the database or elsewhere. If the scene is not recognized, then a new entry in the database may be created to identify subsequent occurrences of the same scene. To that end, a digital "signature" or "fingerprint" of the scene is stored for subsequent analysis. Content may be initially recognized based upon information supplied by human data entry (e.g., crowdsourced data, or data entered by a technician), or by data supplied by a content source (e.g., an advertiser, broadcaster or network), and/or from any other source as desired. Content analyzer 379 is therefore able to identify advertisements or other contents of the received television broadcasts and other video though analysis of the underlying audio or video content.

In many implementations, content identification is performed by the content analyzer 379 in parallel for multiple channels that may be simultaneously received for content aggregation, for collection of advertising data, or for any other purpose. A distributor/aggregator, for example, may encode the extracted signals for distribution on a digital network, for aggregation and redistribution of signals over a DBS or cable distribution system, for generating content stored on a RSDVR or VOD service, or for any other purpose. Content identification could be performed while the content is being processed for redistribution. Alternately, content could be stored for subsequent analysis, as desired.

In some embodiments the content analyzer 379 can perform content analysis in parallel with the encoding provided by the encoder 380. The encoder 380 can encode live broadcast signals and other such video content for adaptive streaming on the network 305 and/or for broadcast via cable, direct broadcast satellite, terrestrial broadcast, and/or the like. Encoder 380, for example, can be used to encode signals into a suitable format for broadcast via cable, DBS, or the like. Such broadcasts may be ultimately received by video player devices 306A-B via the network 305 or the like. In one specific example, the encoder 380 suitably encodes programs contained within signals from the content sources 320 into one or more adaptive streams that each representing a media program in its entirety, but with different bit rates, frame rates, resolution and/or other levels of quality. Typically, each stream is made up of smaller segments that each represent a small portion of the program content with a single data file. Each stream is typically encoded so that segments of the different streams are interchangeable with each other, often using a common timing index. This allows a client video player devices 306A-B to mix and match segments from different streams to create a media stream that effectively adapts as network conditions or other conditions change. Since the segments are typically stored as separate files, segment requests may take the form of conventional hypertext transport protocol (HTTP) constructs (e.g., HTTP "get" instructions) or the like. Such constructs are readily routable on network 305 and can be served by conventional CDN or other web-type servers, thereby providing a convenient mechanism for distributing adaptive media streams to a variety of different client devices on network 305.

Again, other embodiments may use different encoders for the encoder 380. Still other embodiments may omit the encoding function entirely and perform audio analysis or other content recognition separately from the distribution function. Since many distributors already receive program signals for encoding, there may be an economy of scale in performing the content recognition function at the same time. Other embodiments could nevertheless use different encoding or streaming structures or techniques, as desired, or content could be equivalently aggregated and/or broadcast via satellite, cable, terrestrial broadcast, non-adaptive media stream and/or the like. As noted above, it is not necessary that the analyzed content be re-broadcast or re-distributed by the analyzing party in all embodiments. It may be sufficient for many purposes to simply gather data for recognizing advertisements or other portions of the content, for analyzing or further processing information about the recognized advertisements and/or for taking other actions as desired without necessarily re-broadcasting or redistributing the content itself.

Content manager 378 is provided to manage and distribute electronic program guide (EPG) data and other information about the programs that are distributed within streaming server system 304. The content manager 378 may also be implemented to process information relating to advertisements or other portions of the content stream, to associate actions to be performed by the viewer and/or the playback device based upon the content of the stream, and/or for any other purpose.

The data maintained by the content manager 378 could include channel information and timing information about each entry so that the particular content can be readily identified. Other embodiments may use different identification data, such as distributor or network information, or any other information as desired. Some implementations may incorporate conventional EPG data (e.g., data obtained from a vendor or other source), while other implementations may use channel and time so that even portions of a program can be individually identified. Commercials and other advertisements, for example, could be referenced by their channel and broadcast time so that additional actions unique to those advertisements could be enabled. Other embodiments could use different timing references (e.g., references to MPEG presentation time stamps (PTS) in the underlying content, references to event anchors in the content itself, and/or any other timing references) as desired.

In various embodiments, data including information obtained from the content analysis is provided to the video player devices 306A-B. This data could be formatted in any manner. In various embodiments, data could include action data and/or identification data as tags or the like in an XML-type format. Again, many other embodiments could incorporate any number of additional or alternate features to take advantage of the real-time identification feature provided by the broadcaster.

In accordance with the embodiments described herein the video streaming system 300 is implemented to perform one or more automated processes during the streaming of video content from the streaming server system 304 to the plurality of video player devices 306A-B. In general, these automated processes provide for the improved delivery of commercial content in the video streaming server system 304 by providing for the replacement of commercial content in a way that allows multiple relatively short commercials to be replaced with one or more longer commercials. For example, in one embodiment a program channel is monitored at the streaming server system 304 to detect commercial content that has a timespan less than a threshold amount 308. This detected relatively short commercial content is replaced with relatively longer commercial content 310 that has a timespan greater than the threshold amount 308. Stated another way, a shorter advertisement is replaced with a longer advertisement. Because the replacement commercial content 310 has a longer timespan than the originally detected commercial content, this replacement of the first commercial content with the replacement commercial content 310 introduces a delay in the video stream relative to the original content. To compensate for this introduced delay, the timing of the video stream is adjusted to compensate for the difference in the timespan of the original commercial content and the timespan of the replacement commercial content 310. In one embodiment, the streaming server system 304 performs this adjustment by monitoring the program channel to detect later commercial content that also has a timespan less than the threshold amount 308 and then skipping the later detected commercial content with the shorter timespan. Skipping the later detected commercial content reduces the delay in the video stream, and thus compensates for the difference in the timespan of the original commercial content and the replacement commercial content. Taken together these actions effectively result in two or more shorter pieces of commercial content being replaced with a single longer piece of commercial content. Notably, this replacement can occur even when the two shorter pieces of commercial content were not adjacent in time in the video stream.

The various concepts and examples described herein may be modified in any number of different ways to implement equivalent functions and structures in different settings. The term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. An automated process executable by a streaming server in communication with video player device over a network, the automated process comprising:

streaming a program channel as a video stream from the streaming server to the video player device;

monitoring the program channel to detect first commercial content in the program channel, wherein the first commercial content comprises a program promotion for a future program and has a first timespan less than a threshold;

responsive to detecting first commercial content in the program channel, replacing the detected first commercial content in the video stream with replacement commercial content having a second timespan greater than the threshold;

monitoring the program channel to detect additional commercial content in the program channel, wherein the additional commercial content comprises a program promotion for a future program and has a third timespan less than the threshold; and responsive to detecting additional commercial content in the program channel, skipping the detected additional commercial content in the video stream to compensate for a difference in the first timespan and the second timespan.

2. A streaming server in communication with a video player device over a network, the streaming server comprising a processor and a memory, wherein the processor is configured to perform an automated process by executing digital instructions stored in the memory, wherein the automated process comprises:

streaming a program channel as a video stream from the streaming server to the video player device;

monitoring the program channel to detect first commercial content in the program channel having a first timespan less than a threshold;

responsive to detecting the first commercial content in the program channel, replacing the detected first commercial content in the video stream with replacement commercial content having a second timespan greater than the threshold; and adjusting timing of the video stream to compensate for a difference in the first timespan and the second timespan.

3. The streaming server of claim 2 wherein the automated processes further comprises:

monitoring the program channel to detect additional commercial content in the program channel having a third timespan less than the threshold.

4. The streaming server of claim 3 wherein the step of adjusting timing of the video stream to compensate for the difference in the first timespan and the second timespan comprises:

responsive to detecting additional commercial content in the program channel, skipping the detected additional commercial content in the video stream to compensate for a difference in the first timespan and the second timespan.

5. The streaming server of claim 2 wherein the first commercial content comprises a program promotion for a future program.

6. The streaming server of claim 2 wherein the monitoring the program channel to detect first commercial content in the program channel having the first timespan less than the threshold further comprises tracking a number of times the first commercial content has been viewed by a user.

7. The streaming server of claim 2 wherein the monitoring the program channel to detect first commercial content in the program channel having the first timespan less than the threshold comprises comparing content in the program channel to previously identified commercials having the first timespan less than the threshold.

8. The streaming server of claim 2 wherein the monitoring the program channel to detect first commercial content in the program channel having the first timespan less than the threshold comprises monitoring for identification tags provided by a program channel provider.

9. The streaming server of claim 2 wherein the replacement commercial content is selected based at least in part on demographics of a user.

10. The automated process of claim 1 wherein the monitoring the program channel to detect first commercial content in the program channel, wherein the first commercial content comprises the program promotion for the future program and has the first timespan less than the threshold, comprises tracking a number of times the first commercial content has been viewed by a user.

11. The automated process of claim 1 wherein the monitoring the program channel to detect first commercial content in the program channel, wherein the first commercial content comprises the program promotion for the future program and has the first timespan less than the threshold, comprises comparing content in the program channel to previously identified commercials having the first timespan less than the threshold.

12. The automated process of claim 1 wherein the monitoring the program channel to detect first commercial content in the program channel, wherein the first commercial content comprises the program promotion for the future program and has the first timespan less than the threshold, comprises monitoring for identification tags provided by a program channel provider.

13. The automated process of claim 1 wherein the replacement commercial content is selected based at least in part on demographics of a user.

* * * * *